(12) United States Patent
Fischer et al.

(10) Patent No.: US 8,671,695 B2
(45) Date of Patent: Mar. 18, 2014

(54) PROCESS FOR THE PRODUCTION OF HYDROGEN WITH TOTAL RECOVERY OF $CO_2$ AND REDUCTION OF UNCONVERTED METHANE

(75) Inventors: Beatrice Fischer, Lyons (FR); Fabrice Giroudiere, Orlienas (FR); Jean-Louis Ambrosino, Ternay (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 987 days.

(21) Appl. No.: 12/700,353

(22) Filed: Feb. 4, 2010

(65) Prior Publication Data

US 2010/0199682 A1    Aug. 12, 2010

(30) Foreign Application Priority Data

Feb. 9, 2009    (FR) ...................................... 09 00577

(51) Int. Cl.
*F01K 23/10* (2006.01)
(52) U.S. Cl.
USPC ......................... 60/780; 60/39.182; 423/437.1
(58) Field of Classification Search
USPC ............ 60/780, 39.182, 783–784; 423/437.1, 423/650–654; 252/373
See application file for complete search history.

(56) References Cited

U.S. PATENT DOCUMENTS

| | | | |
|---|---|---|---|
| 4,479,925 A | 10/1984 | Shires et al. | |
| 5,935,544 A | 8/1999 | Bhakta | |
| 6,216,464 B1 | 4/2001 | Andersen | |
| 6,235,262 B1 * | 5/2001 | Andersen | 423/650 |
| 2008/0279763 A1 * | 11/2008 | Snyder et al. | 423/648.1 |

FOREIGN PATENT DOCUMENTS

| | | |
|---|---|---|
| EP | 1935847 A1 | 6/2008 |
| FR | 0900577 R | 6/2009 |
| GB | 2160516 A | 12/1985 |
| WO | 0003126 A1 | 1/2000 |

OTHER PUBLICATIONS

Gerhartz, W. and Y.S. Yamamoto. "Ullmann's Encyclopedia of Industrial Chemistry." Ammonia Ed. Amines, Aliphatic to Antibiotics. Jan. 1, 1985. vol. A 2, pp. 180-184.

(Continued)

*Primary Examiner* — William H Rodriguez
*Assistant Examiner* — Carlos A Rivera
(74) *Attorney, Agent, or Firm* — Millen, White, Zelano & Branigan, P.C.

(57) ABSTRACT

This invention relates to a process for the production of hydrogen from a hydrocarbon feedstock and water vapor comprising a stage in which a portion of the hydrocarbon feedstock is sent to a vapor-reforming unit and another portion of the hydrocarbon feedstock is sent directly to an autothermal reformer in a mixture with the effluent that is obtained from a vapor-reforming unit, a vapor-reforming stage of the hydrocarbon feedstock in a vapor-reforming unit, a stage for autothermal reforming of the stream that is obtained in the preceding stage as well as the hydrocarbon feedstock that is sent directly into an autothermal reformer, a vapor conversion stage of the synthesis gas that is obtained in the preceding stage, and a stage for recovering carbon dioxide that is present in the stream that is obtained in the vapor conversion stage.

15 Claims, 4 Drawing Sheets

(56) References Cited

OTHER PUBLICATIONS

Fiaschi, D., et al. "The Recuperative Auto Thermal Reforming and Recuperative Reforming Gas Turbine Power Cycles with CO2 Removal-Part II: The Recuperative Reforming Cycle." Journal of Engineering for Gas Turbines and Power. Jan. 2004. vol. 126, No. 2. pp. 62-68.

Fiaschi, D., and L. Tapinassi. "Exergy Analysis of the Recuperative Auto Thermal Reforming (R-ATR) and Recuperative Reforming (R-REF) Power Cycles with CO2 Removal." Energy. Pergamon Press: Oxford, GB. Oct. 1, 2004. vol. 29. No. 12-15. pp. 2003-2024.

* cited by examiner

PROCESS FOR THE PRODUCTION OF HYDROGEN WITH TOTAL RECOVERY OF CO₂ AND REDUCTION OF UNCONVERTED METHANE

This invention relates to the field of the production of hydrogen, and more particularly a process for the production of hydrogen with total recovery of carbon dioxide ($CO_2$) and reduction of unconverted methane.

Global warming, observed since the industrial era according to the international scientific community, could dramatically modify the climates and ecosystems of numerous regions of the globe. Emission of greenhouse gas and especially carbon dioxide ($CO_2$) seems to be responsible for this warming.

Fossil energy (natural gas, petroleum, carbon) constitutes a large part of the energy that is readily available on the planet. This fossil energy, however, when it is used, produces $CO_2$ (generally during a combustion stage) and is thus implicated in global warming.

One of the solutions that is recommended for combating the global warming by greenhouse gas emissions is to recover the $CO_2$ that is produced and then to store it under ground. Several methods are explored, including recovery by precombustion that consists in converting fossil energy into hydrogen with recovery and storage of the $CO_2$ that is co-produced. Hydrogen, an energy vector, can then be burned freely with no greenhouse gas emissions.

There are currently several means for producing hydrogen industrially, starting from fossil energy. The most widely used means is the vapor reforming of natural gas that is implemented in an SMR furnace (SMR=Steam Methane Reforming according to the English terminology) that offers the advantage of using a feedstock that has a high hydrogen/carbon ratio, taking into account the high methane content in its composition. In a simplified way, the SMR catalytic reaction can be written in the following manner:

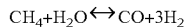

$$CH_4 + H_2O \leftrightarrow CO + 3H_2$$

This very endothermic reaction is balanced. It is promoted by high temperatures and is carried out in general in a furnace that is heated by a fuel such as natural gas. The SMR unit is conventionally followed by a WGS vapor conversion stage (WGS=Water Gas Shift according to the English terminology) that makes it possible to maximize the production of hydrogen by the following reaction:

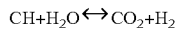

$$CH + H_2O \leftrightarrow CO_2 + H_2$$

When it is necessary to recover $CO_2$ for the purpose of its storage, it is then possible to use an amine washing unit (activated methyl diethanolamine, MDEA, for example) that will extract the $CO_2$ from the hydrogen-rich stream, which will then be sent, for example, into a gas turbine for the purpose of producing electricity, while the $CO_2$ is compressed and sent back under ground.

In this type of process, the objective of recovery of $CO_2$ is not fully achieved because not only does $CO_2$ still remain at the output of the turbine because of the presence of methane, CO and $CO_2$ that are still present in the hydrogen, but more natural gas is necessary at the input than if it were sent directly into the turbine. In addition, the furnace in which the vapor-reforming is implemented uses natural gas and therefore emits a lot of $CO_2$. The $CO_2$ avoidance level is therefore low.

An improvement to this technique consists in adding a pressure-modulated molecular-sieve adsorption unit of impurities (PSA). Two streams are thus obtained: a 99.99% pure hydrogen stream, and a stream of impurities containing at least 20% hydrogen. This low-pressure stream is sent into the burners of the vapor-reforming furnace, which reduces the natural gas that is necessary for the furnace, and therefore the production of $CO_2$. However, the $CO_2$ avoidance level remains low, since, on the one hand, the impurities will exit in the form of $CO_2$ in the flue gases of the furnace, and, on the other hand, it is necessary to produce more hydrogen, and therefore to use more natural gas for the vapor-reforming feedstock.

Another process for the production of hydrogen that makes it possible to reduce unconverted methane is autothermal reforming (ATR for autothermal reforming according to the English terminology). Unlike the standard vapor reforming, autothermal reforming requires the input of compressed air for the reaction. However, the compression of air is very energy-intensive, and it impairs the overall yield of the installation. In addition, the very high flow rates of nitrogen that are present with the air increase the size of all of the installations downstream. In the case where pure oxygen is used instead of air to prevent the presence of nitrogen, it is then necessary to provide an installation for air separation, which increases the costs.

This invention therefore has as its object to remedy one or more of the drawbacks of the prior art by proposing a process for the production of hydrogen and electricity that makes it possible to recover the $CO_2$ and to reduce the quantity of unconverted methane, while maintaining a high overall energy yield, with fairly low investments.

For this purpose, this invention proposes a process for the production of hydrogen starting from a hydrocarbon feedstock and water vapor comprising:

A stage in which a portion of the hydrocarbon feedstock is sent to a vapor-reforming unit and another portion of the hydrocarbon feedstock is sent directly to an autothermal reformer in a mixture with the effluent that is obtained from a vapor-reforming unit, A vapor-reforming stage of the hydrocarbon feedstock in a vapor-reforming unit, A stage for autothermal reforming of the stream that is obtained in the preceding stage as well as the hydrocarbon feedstock that is sent directly into an autothermal reformer, A vapor conversion stage of the synthesis gas that is obtained in the preceding stage and that makes it possible to convert carbon monoxide and to increase the hydrogen stream, A stage for recovering carbon dioxide that is present in the stream that is obtained in the vapor conversion stage that makes it possible to separate the carbon dioxide from the hydrogen stream.

According to one embodiment of the invention, the hydrocarbon feedstock is natural gas.

According to one embodiment of the invention, the proportion of hydrocarbon feedstock that is sent directly to the autothermal reactor is between 15 and 50%.

According to one embodiment of the invention, the vapor reforming is implemented in at least one reactor-exchanger.

In one embodiment of the invention, the heat of the reactor-exchanger is provided by the flue gases of a gas turbine, heated in at least one combustion chamber that is arranged before the reactor exchanger.

According to one embodiment of the invention, a portion of the hydrogen stream is sent in a mixture with the water vapor to a gas turbine to produce electricity.

According to one embodiment of the invention, the recovery stage of the carbon dioxide is implemented in an amine unit that uses methyl diethanolamine and at least one other amine.

Other characteristics and advantages of the invention will be better understood and will emerge more clearly from reading the given description, below, by referring to the accompanying figures and exhibiting embodiments according to the prior art or the invention:

BRIEF DESCRIPTION OF THE DRAWINGS

As illustrated in FIGS. 1, 2, and 3, during the process for the production of hydrogen, a stream of hydrocarbon feedstock, and, for example, natural gas, brought in via a pipe (1), and a stream of water vapor that circulates in a pipe (2) are sent as feedstock into a vapor-reforming unit (11). The heat that is necessary to the reaction is produced by a fuel stream, for example natural gas, sent via a pipe (10) into the vapor-reforming furnace. At the output of the furnace (110), this reaction produces a stream of flue gases that contain carbon dioxide. The stream of synthesis gas that circulates in a pipe (30, 24) that is obtained by the vapor-reforming reaction primarily contains hydrogen ($H_2$), carbon monoxide (CO), carbon dioxide ($CO_2$), as well as water vapor ($H_2O$), and a small amount of methane that has not reacted ($CH_4$), because the reaction is balanced, and even at a temperature of 900° C., about 4 mol % of methane that has not reacted remains.

Figure 1:
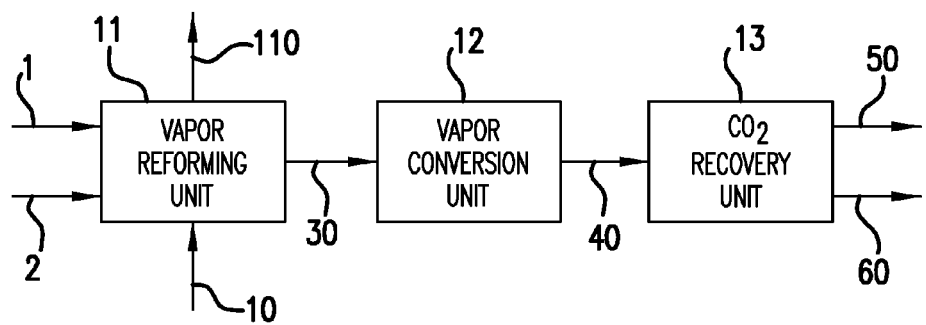
FIG. 1 shows a standard diagram of the process for production of hydrogen according to the prior art.

In the process according to the invention (illustrated in FIGS. 3 and 5), the stream of synthesis gas is brought via the pipe (24) into a secondary autothermal reformer (16). The autothermal reformer (16) that is used in the process according to the invention can be any type of standard autothermal reformer that is well known to one skilled in the art. This autothermal reformer (16) is supplied by the stream that is obtained from the vapor-reforming unit and by a portion of the stream of natural gas that circulates in a pipe (1b). In the process according to the invention, only a portion of the stream of natural gas that circulates in a pipe (1a) supplies the vapor-reforming unit (11); the other portion of the stream of natural gas that circulates in the pipe (1b) circumvents or avoids (bypasses according to the English terminology) the vapor-reforming unit and directly supplies the autothermal reformer (16). In general, between 15% and 50%, preferably between 25 and 45%, and very preferably between 30% and 40%, of the quantity of natural gas circumvents the vapor-reforming unit (11) and passes directly into the autothermal reactor (16). In this manner, the quantity of air to be supplied to the autothermal reformer remains low compared to the solution of the prior art (illustrated in FIG. 2) where the autothermal reformer (16) replaces the vapor-reforming unit of FIG. 1, which requires the supply of a large quantity of compressed air via the pipe (211). In the process according to the invention, the quantity of nitrogen that is added thus is not detrimental.

The use of the autothermal reformer (16), also called a secondary reformer, in addition to the vapor-reforming unit (11), makes it possible to obtain a high yield at the vapor-reforming reaction and then to convert the unconverted methane fraction with the secondary autothermal reformer (16).

In addition, the circumvention of the vapor-reforming unit by a portion of natural gas makes it possible to adjust the water vapor/carbon ratio to a correct value both in the vapor-reforming unit (11), for example between 2 and 4, preferably between 2.6 and 2.8, and in the autothermal reactor (16), for example between 1 and 2, preferably between 1.7 and 1.9, and to reduce the size of the vapor-reforming section and therefore to reduce the investments. Actually, it is necessary to put in more water vapor than stoichiometry would require to prevent parasitic reactions, such as, for example, the thermal cracking that would cause carbon deposits, this carbon running the risk of poisoning the catalyst in particular.

The vapor-reforming process that is implemented in the vapor-reforming unit (11) can preferably be a process for co-generation by gas turbine (illustrated in FIGS. 4 and 5), in which the reforming is not carried out in a furnace, but in a reactor-exchanger and in which the heat is provided by flue gases that are under pressure and that are obtained from a portion of a gas turbine, heated in a burner.

Figure 5:
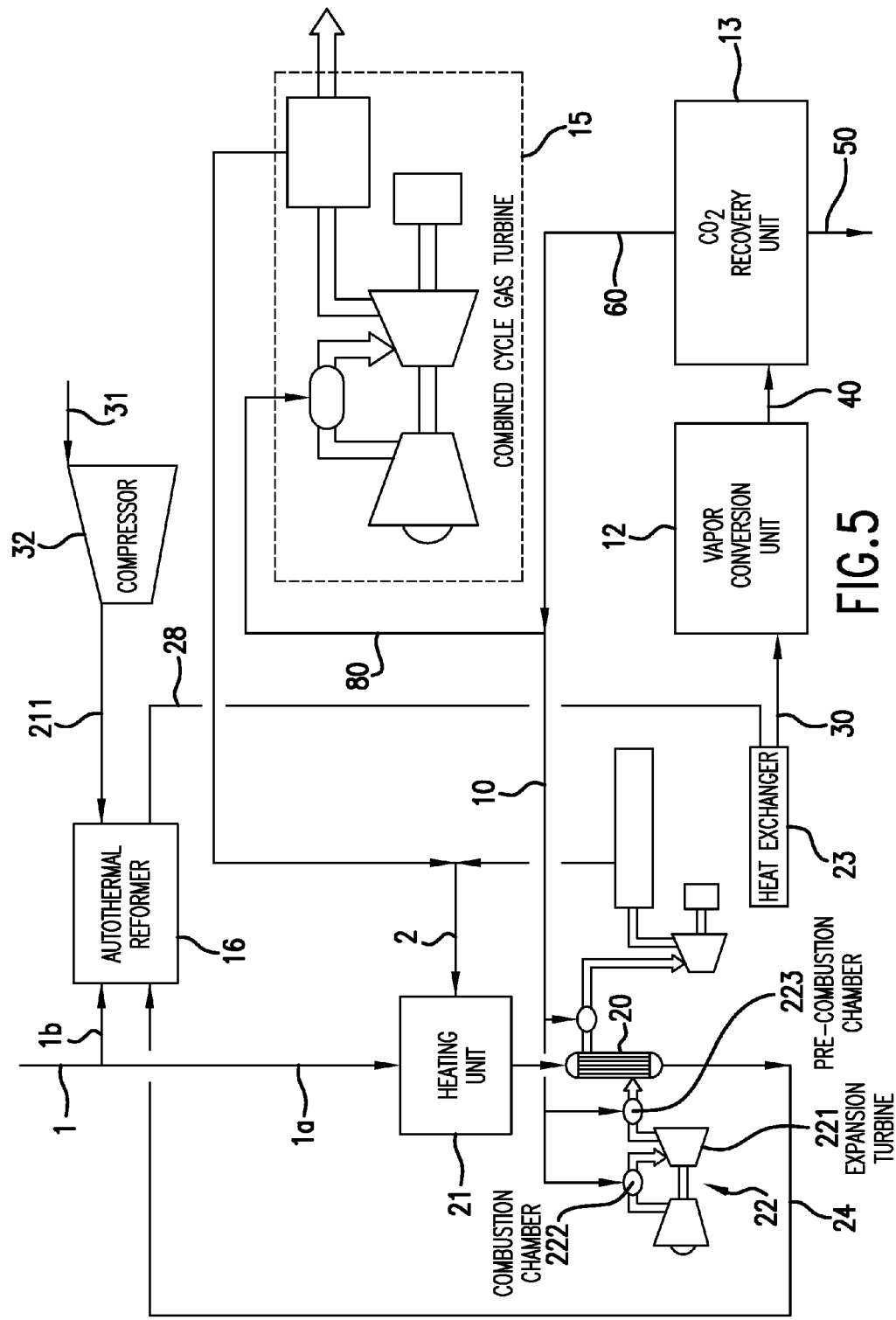
FIG. 5 shows the diagram of another embodiment of the process according to the invention.

FIG. 5 diagrammatically shows this process applied to the production of electricity. The gas turbines each comprise an expansion-compression cell with an air compressor (220) that is linked via a shaft to an expansion turbine (221) and to a combustion chamber (222). This expansion turbine (221) is connected to a precombustion chamber (223) that is connected to a reactor-exchanger-type exchange means (20). During the operation of the unit, the gas turbines (22) generate a stream of hot flue gases that is under pressure and that is reheated in the combustion chambers upstream from the reactor-exchangers (20). In the reactor-exchangers, the heat of the warm flue gases is transferred to the natural gas/water vapor reaction mixture and makes it possible for the very endothermic vapor-reforming reaction to be implemented. The process can implement between 1 and 3 turbines and 1 and 3 reactor-exchangers and preferably 2 turbines and 2 reactor-exchangers.

The unit comprises heat exchangers (23) for recovering the heat at the output of the reactor (20) via the pipe (29) or the reactor (16) via the pipe (28). The heating unit (21) makes possible a preheating of the feedstock and the water vapor. A pretreatment (desulfurization) of the feedstock, not shown, can also be added. This process for co-generation by gas turbine is described, for example, in a more detailed manner in the patent application WO2004/083729.

Figure 4:
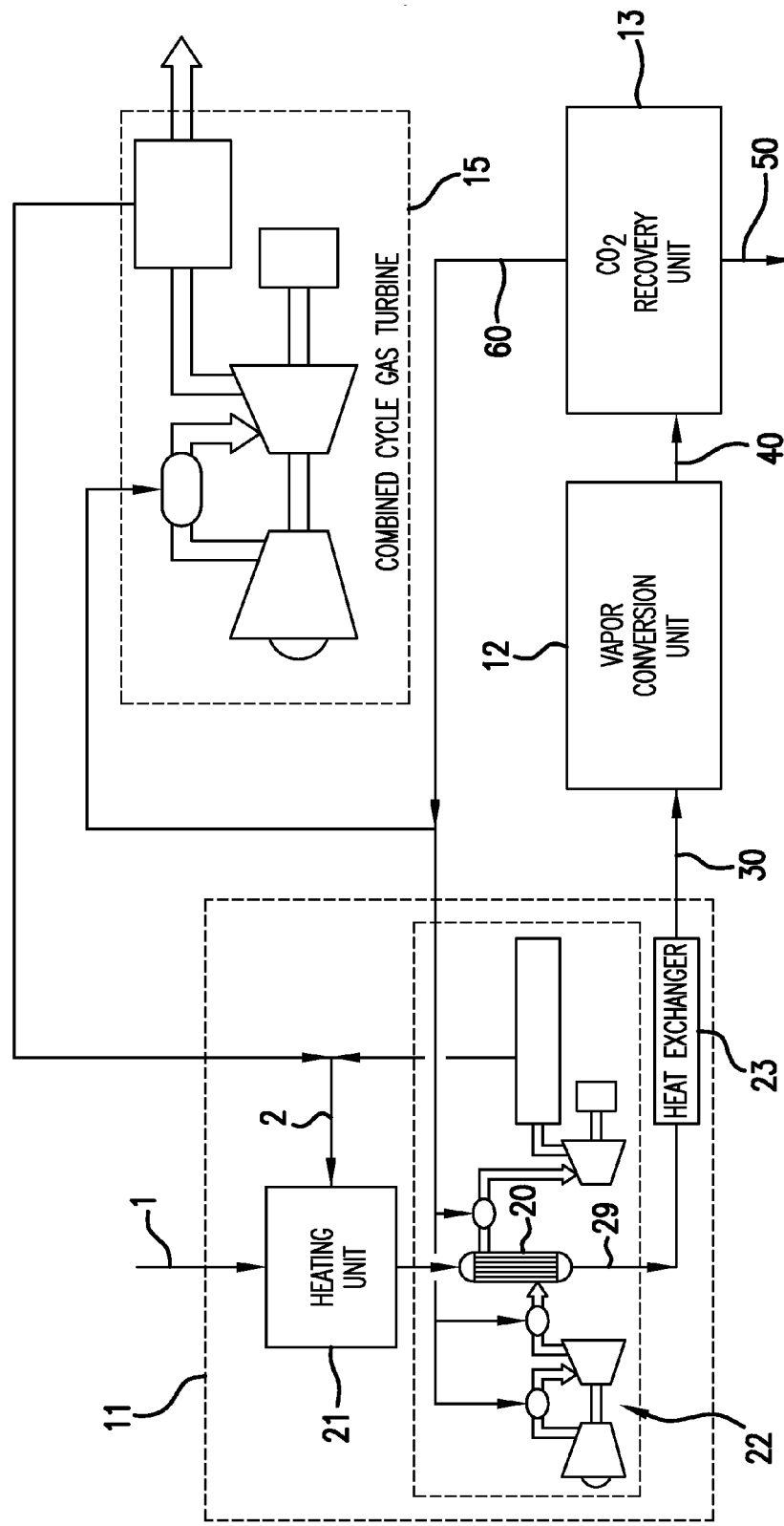
FIG. 4 shows a variant of the standard diagram of the process for production of hydrogen according to the prior art.

The use coupled with a vapor-reforming unit and an autothermal reformer in the process according to the invention allows for a better conversion of the methane than the use of a vapor-reforming unit by itself, illustrated in FIGS. 1 and 4. This coupled use thus makes possible a better recovery of $CO_2$, while reducing the quantity of compressed air relative to a simple autothermal reforming. The process according to the invention makes it possible, in addition, to obtain better energy effectiveness by minimizing the loss of power for the compression of the air. This energy effectiveness is defined as the power that is supplied by the gas turbines and vapor turbines and that is reduced by the entire electrical consumption of the process and divided by the product of the PCI (net calorific value) of the natural gas that is consumed by the flow rate of natural gas.

Figure 2:
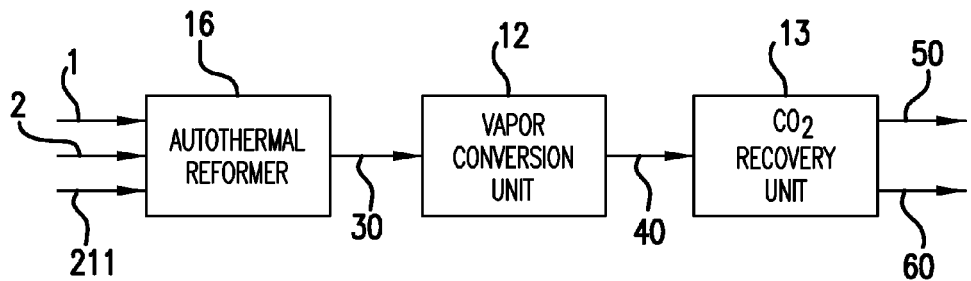
FIG. 2 shows a variant of the standard diagram of the process for the production of hydrogen using an autothermal reformer according to the prior art.

This process also makes possible a reduction of investments relative to the processes according to the prior art (FIGS. 1, 2 and 4).

The autothermal reformer is supplied by the pipe (211) with compressed air that is obtained from the compression by a compressor (32) of air brought via the pipe (31).

Figure 3:
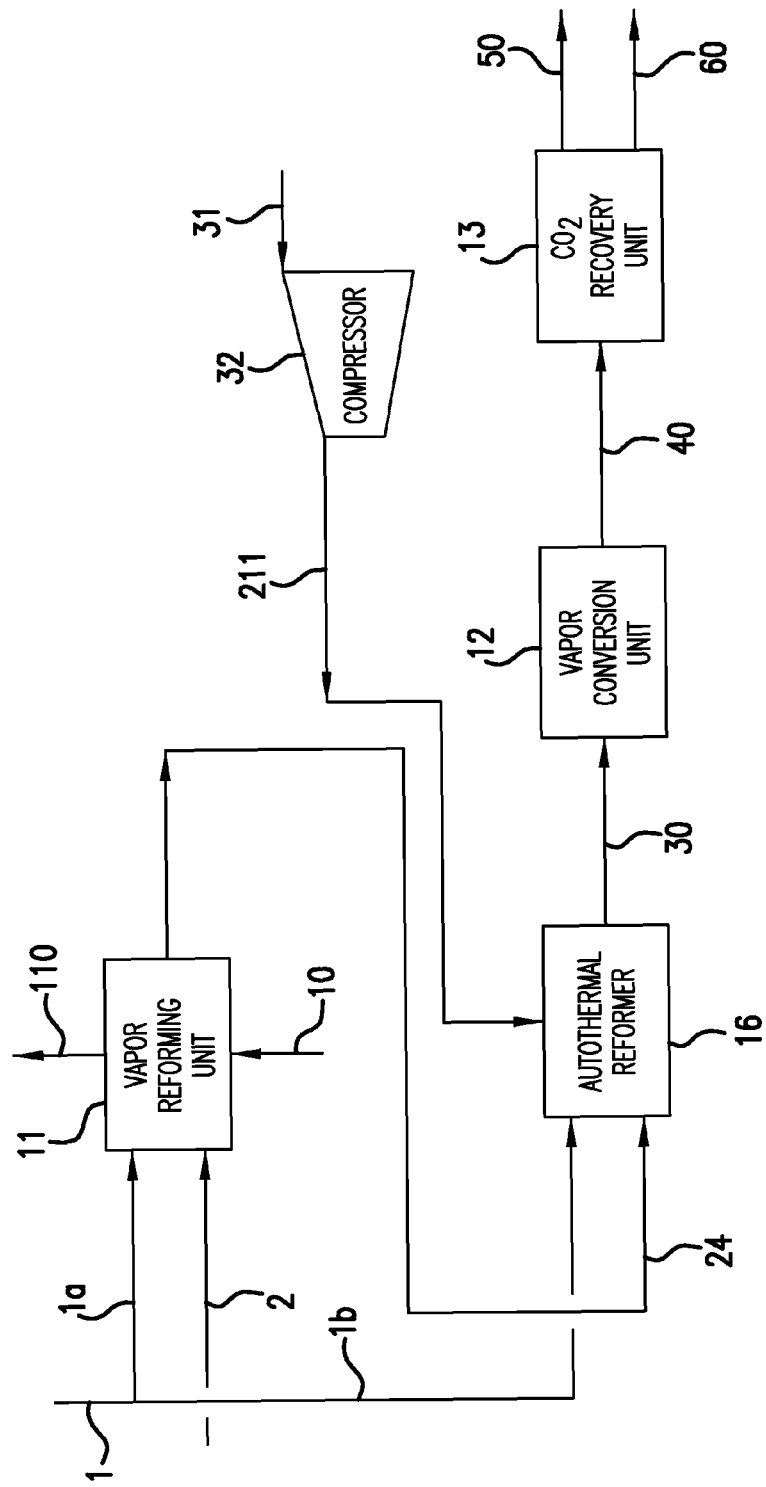
FIG. 3 shows the diagram of an embodiment of the process for production of hydrogen according to the invention.

As illustrated in FIGS. 3 and 5, the stream of synthesis gas obtained at the output of the autothermal reformer (16) is sent via a pipe (30) to the vapor conversion unit (12). In this unit, the essential portion of the carbon monoxide is converted into carbon dioxide using water vapor, at the same time releasing a little more hydrogen. This reaction also is balanced, and there finally remains a little carbon monoxide (0.5% under advanced conversion conditions). At the output of the conversion unit (12), the conversion stream that is obtained and that circulates in a pipe (40) essentially contains hydrogen and carbon dioxide as well as the nitrogen that is obtained from the air that is sent to the autothermal reformer. This conversion stream also contains a little methane and carbon monoxide, whereby the remainder of the water vapor has been condensed after the vapor conversion reaction.

The conversion stream is then sent to a $CO_2$ recovery unit (13), which can be a unit for recovery of $CO_2$ by amines, and an amine unit that uses methyl diethanolamine (MDEA) in combination with at least one other amine is particularly suitable. It is possible to use other $CO_2$ recovery units that are well known to one skilled in the art.

The essential portion of $CO_2$ is separated and sent via a pipe (50) to a unit for compression and drying to then be transported to a reinjection site such as a played-out deposit or a suitable geological layer.

The hydrogen-rich gas is evacuated through another pipe (60). This gas comprises nitrogen, a little methane, carbon monoxide, and a little unrecovered carbon dioxide (approximately 0.5%).

To not have $CO_2$ emitted by the vapor-reforming furnace, a portion of the hydrogen that is produced in the vapor-reforming unit is used. A portion of the hydrogen that is obtained from the vapor-reforming unit is therefore sent to the burners of the vapor-reforming unit via the pipe (10) so that the flue gases that exit via the pipe (110) do not comprise $CO_2$.

According to an embodiment of the invention, the remainder of the hydrogen is sent, via the pipe (80), at a pressure that is generally between 2 MPa and 3 MPa, and, for example, 2.5 MPa, and at a temperature that is generally between 60° C. and 130° C. to the combustion chambers of a combined cycle gas turbine (15) that is well known to one skilled in the art for producing electricity. The hydrogen is used here in a mixture with the water vapor for dilution. The combined cycle also produces the water vapor that also generates electricity using vapor turbines. A portion of the water vapor is drawn off to be used by the vapor reforming and the autothermal reforming. The combustion chambers of the gas turbines are not currently able to burn pure hydrogen. It is therefore necessary to dilute this hydrogen with the water vapor that is obtained from combined cycles, which slightly reduces the effectiveness of the whole. In the process according to the invention, the nitrogen that is obtained from the air that is injected into the autothermal reformer is mixed with the hydrogen that is sent to the combustion chambers of the gas turbines, which makes it possible to reduce proportionately the necessary amount of water vapor and therefore improves the overall effectiveness of the process.

The following examples illustrate this invention.

EXAMPLE 1 ACCORDING TO THE PRIOR ART

It is desired to implement an electrical production of 400 MW using a combined cycle (gas turbine+recovery of heat at the output of the turbine with production of vapor and vapor turbines). According to the techniques of the prior art, two cases are possible.

a—Only one autothermal reformer (FIG. 2) is used instead of the vapor-reforming unit; a recovery of CO2 of more than 90%, but an overall effectiveness of close to 41% are achieved.

b—Only one vapor-reforming unit of the co-generation process type per gas turbine (11) is used (illustrated in FIG. 4). The gas turbine unit (22) comprises 3 gas turbines in parallel, and the reactor-exchanger unit (20) comprises 3 reactor-exchangers that make it possible to produce enough hydrogen for the primary turbine (15) and the 3 gas turbines (22). The simulation provides an overall effectiveness of 44.1%, but a $CO_2$ avoidance level of only 71%, which is inadequate.

EXAMPLE 2 ACCORDING TO THE INVENTION

It is desired to implement an electrical production of 400 MW using a combined cycle (gas turbine+recovery of heat at the output of the turbine with production of vapor and vapor turbines).

The process according to the invention that is illustrated in FIG. 5 is used. It uses only 2 turbines in parallel (22) with 2 reactor-exchangers (20), and the output of these two reactors is sent via the pipe (24) to the autothermal reactor (16) with approximately one-third of natural gas (1a). The autothermal reactor produces a portion of the reaction; it therefore is not necessary to arrange three reactors in parallel; two are sufficient. Air that is brought via the pipe (31) is compressed by a compressor (32) and sent via the pipe (211) to the autothermal reactor to make the reaction possible. It is not necessary to send water vapor because the proportion of unused vapor in the vapor reforming represents an adequate quantity for the supply of the autothermal reactor, even with the additional natural gas (1a). Actually, the vapor/carbon ratio is much lower for an autothermal reactor (typically between 1 and 2 on natural gas) than in the vapor reforming (typically between 2 and 4). The simulation of these cases leads to an avoidance level of 91.1% and an effectiveness of 42.1%, which is better than the autothermal case by itself.

It should be obvious to one skilled in the art that this invention should not be limited to the details and embodiments that are provided above and makes possible embodiments in numerous other forms without moving away from the field of application of the invention. Thus, it is possible to send additional water vapor to the autothermal reactor, for example when the feedstock is heavier than the natural gas and requires it. Consequently, these embodiments should be considered by way of illustration and can be modified without, however, exceeding the scope that is defined by the accompanying claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 09/00.577, filed Feb. 9, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of hydrogen from a hydrocarbon feedstock and water vapor comprising:
    sending a first portion of the hydrocarbon feedstock to a vapor-reforming unit and sending another portion of the hydrocarbon feedstock directly to an autothermal reformer in a mixture,
    subjecting said first portion of the hydrocarbon feedstock to vapor-reforming in said vapor-reforming unit, wherein the water vapor/carbon ratio in said vapor-reforming unit is between 2.6 and 2.8, to produce a vapor-reformed effluent stream, wherein said vapor-reforming unit is a reactor-exchanger in which heat for the reactor-exchanger is provided by flue gases from of a gas turbine that are heated in at least one combustion chamber arranged before said reactor-exchanger,
    subjecting said vapor-reformed effluent stream and said another portion of the hydrocarbon feedstock to autothermal reforming in said autothermal reformer, wherein the water vapor/carbon ratio in said autothermal reactor is between 1.7 and 1.9, to produce a synthesis gas,
    subjecting said synthesis gas to vapor conversion in a vapor conversion stage to convert carbon monoxide and to increase the hydrogen content in the resultant hydrogen stream,
    recovering carbon dioxide present in said hydrogen stream obtained from said vapor conversion stage in a carbon dioxide recovery stage thereby separating carbon dioxide from the hydrogen stream,
    heating said vapor-reforming unit by combustion of a portion of said hydrogen stream obtained from said carbon dioxide recovery stage,
    sending the remainder of said hydrogen stream obtained from said carbon dioxide recovery stage to said at least one combustion chamber arranged before said reactor-exchanger.

2. The process according to claim 1, in which the hydrocarbon feedstock is natural gas.

3. The process according to claim 1, in which the proportion of hydrocarbon feedstock that is sent directly to the autothermal reactor is between 15 and 50%.

4. The process according to claim 1, in which said portion of said hydrogen stream from said carbon dioxide recovery stage is sent in a mixture with water vapor to said gas turbine for producing electricity.

5. The process according to claim 1, in which recovery of carbon dioxide in said carbon dioxide recovery stage is implemented in an amine unit that uses methyl diethanolamine and at least one other amine.

6. The process according to claim 1, wherein the proportion of hydrocarbon feedstock that is sent directly to the autothermal reactor is between 25 and 45%.

7. The process according to claim 1, wherein the proportion of hydrocarbon feedstock that is sent directly to the autothermal reactor is between 30% and 40%.

8. The process according to claim 3, wherein the hydrocarbon feedstock is natural gas.

9. The process according to claim 4, wherein the hydrocarbon feedstock is natural gas.

10. The process according to claim 5, wherein the hydrocarbon feedstock is natural gas.

11. The process according to claim 6, wherein the hydrocarbon feedstock is natural gas.

12. The process according to claim 7, wherein the hydrocarbon feedstock is natural gas.

13. The process according to claim 1, wherein said synthesis gas is sent directly from said autothermal reforming to said vapor conversion stage.

14. The process according to claim 1, wherein said gas turbine is a combined cycle gas turbine (15) for producing electricity.

15. The process according to claim 14, wherein said remainder of the hydrogen stream is sent to said combustion chambers of a combined cycle gas turbine (15) at a pressure between 2 MPa and 3 MPa, and at a temperature between 60° C. and 130° C.

* * * * *